United States Patent
Tamai et al.

(10) Patent No.: US 10,227,025 B2
(45) Date of Patent: Mar. 12, 2019

(54) RESIN COVER AND VEHICLE SEAT HAVING RESIN COVER

(71) Applicant: TACHI-S CO., LTD., Akishima-shi, Tokyo (JP)

(72) Inventors: Takamasa Tamai, Tokyo (JP); Naoyuki Makita, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 25 days.

(21) Appl. No.: 15/476,831

(22) Filed: Mar. 31, 2017

(65) Prior Publication Data

US 2017/0305320 A1 Oct. 26, 2017

(30) Foreign Application Priority Data

Apr. 25, 2016 (JP) .................................. 2016-087150

(51) Int. Cl.
*B60N 2/60* (2006.01)
*B32B 27/00* (2006.01)
*B60R 13/02* (2006.01)
*B60N 2/58* (2006.01)

(52) U.S. Cl.
CPC ................ *B60N 2/60* (2013.01); *B32B 27/00* (2013.01); *B60R 13/0275* (2013.01); *B60N 2/58* (2013.01); *B60R 13/02* (2013.01)

(58) Field of Classification Search
CPC .. B60N 2/60; B60N 2/58; B32B 27/00; B60R 13/0275; B60R 13/02
USPC .................................................... 297/452.38
See application file for complete search history.

(56) References Cited

U.S. PATENT DOCUMENTS

| 6,074,150 | A | * | 6/2000 | Shinozaki | ........... B60R 13/0206 24/297 |
| 6,449,814 | B1 | * | 9/2002 | Dinsmore | ............... F16B 5/065 24/289 |
| 7,287,945 | B2 | * | 10/2007 | Lubera | .................... F16B 5/065 24/295 |
| 7,300,089 | B2 | * | 11/2007 | Kuroda | ............... B60R 13/0206 24/297 |
| 7,862,273 | B2 | * | 1/2011 | Ooyama | ................. F16B 5/065 411/45 |
| 8,793,845 | B2 | * | 8/2014 | Benedetti | ................ F16B 5/065 24/292 |

(Continued)

FOREIGN PATENT DOCUMENTS

| JP | 2001-050228 A | 2/2001 |
| JP | 2006-329311 A | 12/2006 |

*Primary Examiner* — Mark R Wendell
(74) *Attorney, Agent, or Firm* — Shapiro, Gabor and Rosenberger, PLLC

(57) ABSTRACT

Provided is a resin cover for covering a surface of a structure by being inserted and secured together with a metallic clip into a hole portion formed in the structure, the resin cover is formed with a clip squeezing portion for mounting the metallic clip, the clip squeezing portion is formed with a flexure control rib, and the flexure control rib is formed to restrict the defamation amount of a claw portion formed on the metallic clip to prevent the metallic clip from being pulled back from the hole portion formed in the structure when the metallic clip is urged to be pulled back from the hole portion formed in the structure in the state that the metallic clip mounted on the clip squeezing portion is inserted into the hole portion formed in the structure.

16 Claims, 4 Drawing Sheets

(56) References Cited

U.S. PATENT DOCUMENTS 9,488,202 B2 * 11/2016 Komeno et al. .... B60R 13/0206
2014/0000071 A1 * 1/2014 Choi .................... F16B 21/075
  24/543

* cited by examiner

RESIN COVER AND VEHICLE SEAT HAVING RESIN COVER

CLAIM OF PRIORITY

The present application claims priority from Japanese Patent Application JP 2016-87150 filed on Apr. 25, 2016, the content of which is hereby incorporated by reference into this application.

BACKGROUND OF THE INVENTION

The present invention relates to a resin cover formed with a fastening portion for making an attachment to a metal frame of a vehicle seat and a vehicle seat having the resin cover.

As a configuration for attaching a resin cover for a vehicle seat to a metallic frame, Patent Literature 1 (Japanese Unexamined Patent Application Publication NO. 2006-329311) and Patent Literature 2 (Japanese Unexamined Patent Application Publication NO. 2001-50228) disclose a configuration that a metallic clip is mounted on a protrusion formed on the resin cover and is inserted into a hole formed in the metallic frame, so that a claw formed on the metallic clip restricts the metallic clip from coming off from the hole formed in the metallic frame to secure the resin cover to the metallic frame.

By taking the configuration that as described in Japanese Unexamined Patent Application Publication NO. 2006-329311 and Japanese Unexamined Patent Application Publication NO. 2001-50228, the metallic clip is mounted on the protrusion formed on the resin cover and is inserted into the hole formed in the metallic frame to be secured, it becomes possible to decrease the number of man-hours in comparison with the case wherein the resin cover is secured to the metallic frame by screws, and hence, to reduce the manufacturing cost.

The dimension of holes formed in the metallic frame is not necessarily uniform, and it is often the case that the dimension of the holes may be set to be a little larger. Where it is tried to secure the resin cover by the use of metallic clips common to the holes being different in dimension, a problem arises as follows. That is, if a dimension of a hole formed in the metallic frame is larger than a dimension of a hole corresponding originally to the metallic clip, there arises a case wherein the metallic clip easily comes off from the hole formed in the metallic frame even when squeezed by a protrusion formed on the resin cover, so that it becomes unable to attach the resin cover reliably to the metallic frame.

As a countermeasure, it may be conceived to cope with this problem by preparing metallic clips for respective dimensions of the holes formed in the metallic frame and by forming protrusions formed on the resin cover in different dimensions for respective dimensions of the metallic clips.

However, the metallic clips are general-purpose components and thus, it is often the case that the dimensions of the metallic clips are not adjusted to the dimensions that correspond to the dimensions of all of holes formed in the metallic frame. In the technology as described in Patent Literature 1 and Patent Literature 2, consideration has not been taken into making it possible to attach the resin cover to the metallic frame by using the general-purpose metallic clips even in the case where the clips do not conform to the dimensions of the holes originally formed in the metallic frame.

SUMMARY OF THE INVENTION

Therefore, the present invention has been made to solve the foregoing problem in the prior art, and it is an object of the present invention to provide a resin cover capable of being reliably secured also to a metallic frame formed with holes of dimensions that are larger than those to which metallic clips originally correspond, and also to provide a vehicle seat having the resin cover.

In order to solve the aforementioned problem, the present invention resides in a resin cover that covers a surface of a structure by being inserted and secured together with a metallic clip into a hole portion formed in the structure, wherein the resin cover is formed with a clip squeezing portion for mounting the metallic clip, wherein the clip squeezing portion is formed with a flexure control rib, and when the metallic clips is urged to be pulled back from the hole portion formed in the structure in the state that the metallic clip mounted on the clip squeezing portion is inserted into the hole portion formed in the structure, the flexure control rib restricts the deformation amount of a claw portion formed on the metallic clip to prevent the metallic clip from being pulled back from the hole portion formed in the structure.

Further, in order to solve the aforementioned problem, the present invention resides in a resin cover that covers a surface of a structure by being inserted together with a metallic clip into a hole portion formed in the structure to be secured, wherein the resin cover is formed with a clip squeezing portion for mounting a metallic clip, wherein the clip squeezing portion is formed with a flexure control rib, and wherein the dimension of the flexure control rib is set to make the gap between an extreme end portion of a claw portion formed on the metallic clip and the flexure control rib smaller than a dimension by which the most spreading portion of the claw portion protrudes beyond the hole portion formed in the structure in the state that the metallic clip mounted on the clip squeezing portion is inserted into the hole portion formed in the structure.

Further, in order to solve the aforementioned problem, the present invention resides in a vehicle seat equipped with a seat cushion, a seat back and a head rest, wherein the seat cushion is provided at a lower portion with a side frame for storing a mechanical component inside and a resin cover for covering a surface of the side frame by being inserted together with a metallic clip into a hole portion formed in the side frame, wherein the resin cover is formed with a clip squeezing portion for attaching a metallic clip, wherein the clip squeezing portion is formed with a flexure control rib, and when the metallic clip is urged to be pulled back from the hole portion formed in the side frame in the state that the metallic clip mounted on the clip squeezing portion is inserted into the hole portion formed in the side frame, the flexure control rib restricts the deformation amount of a claw portion formed on the metallic clip to prevent the metallic clip from being pulled back from the hole portion formed in the side frame.

Furthermore, in order to solve the aforementioned problem, the present invention resides in a vehicle seat equipped with a seat cushion, a seat back and a head rest, wherein the seat cushion is provided at a lower portion with a side frame for storing a mechanical component inside and a resin cover for covering a surface of the side frame by being inserted together with a metallic clip into a hole portion formed in the side frame, wherein the resin cover is formed with a clip squeezing portion for mounting a metallic clip, wherein the clip squeezing portion is formed with a flexure control rib, and wherein the dimension of the flexure control rib is set to make the gap between an extreme end portion of a claw portion formed on the metallic clip and the flexure control rib smaller than a dimension by which the most spreading portion of the claw portion protrudes beyond the hole portion formed in the side frame in the state that the metallic clip mounted on the clip squeezing portion is inserted into the hole portion formed in the side frame.

According to the present invention, it can be realized to provide the resin cover capable of being reliably secured even to the metallic frame formed with the hole of the dimension that is larger than a dimension to which the metallic clip originally corresponds, and to provide the vehicle seat having the resin cover.

These features and advantages of the invention will be apparent from the following more particular description of preferred embodiments of the invention, as illustrated in the accompanying drawings.

The foregoing features and advantages of the invention will be apparent from the following more particular description of a preferred embodiment of the invention, as illustrated in the accompanying drawings.

DETAILED DESCRIPTION OF THE PREFERRED EMBODIMENT

The present invention is designed to make it possible to attach a resin cover to a metallic frame by the use of a general-purpose metallic clip even where the clip does not conform to the dimension of a hole formed originally in the metallic frame. That is, the present invention relates to a resin cover that makes it possible to be reliably secured even to a metallic frame formed with a hole of the dimension that is larger than a dimension to which a general-purpose metallic clip originally corresponds, and further to a vehicle seat having the resin cover.

For example, the present invention is designed to make it possible to reliably attach a resin cover to a hole being 7 millimeters in width formed in a metallic frame by the use of a metallic clip that corresponds to a hole being 6 millimeters in width.

Hereafter, an embodiment of the present invention will be described with reference to the drawings. However, the present invention is not to be constructed with a limitation to the content in the description of the embodiment described hereinafter. It can easily be understood to those skilled in the art to modify the specific configuration without departing from the technical concept or the gist of the present invention.

Embodiment

Figure 1:
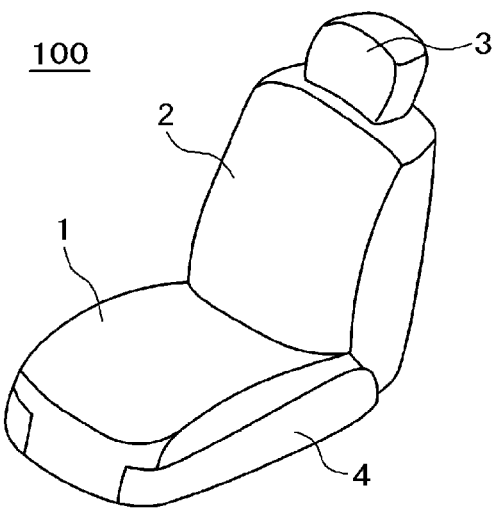
FIG. 1 is a perspective view of a vehicle seat according to an embodiment of the present invention.

FIG. 1 shows a basic configuration of a vehicle seat 100 being the subject of the present invention. The vehicle seat 100 is equipped with a seat cushion 1 on which a passenger is seated, a seat back 2 against which the passenger seated on the seat cushion 1 leans at his/her back, and a head rest 3 for supporting the head of the passenger. The lower portion of the seat cushion 1 is covered with a resin cover 4.

Figure 2:
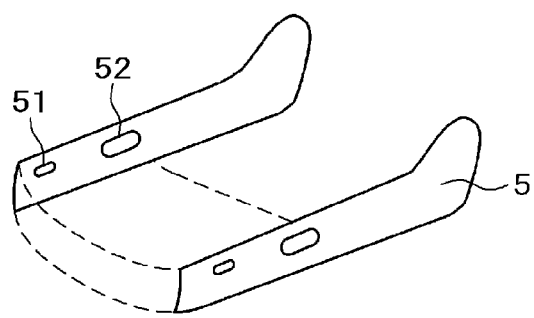
FIG. 2 is a perspective view of a side frame of the vehicle seat according to the embodiment of the present invention.

FIG. 2 shows a side frame 5 for covering the outside of mechanical components at a lower part of the seat cushion 1. The side frame 5 is made of a metal, mounts thereon mechanical components such as springs not shown, and is provided with a slot hole 51 and an elongate hole 52 for securing the resin cover 4 with a clip 6 (refer to FIG. 5).

Figure 3:
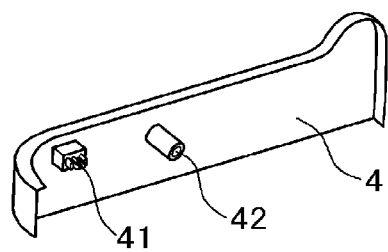
FIG. 3 is a perspective view of a resin cover of the vehicle seat according to the embodiment of the present invention.

FIG. 3 is the resin cover 4 made of a resin for covering the outside of the side frame 5. The resin cover 4 is formed with a mounting base portion 41 on which a clip squeezing portion 411 (refer to FIG. 4) for being attached to the side frame 5 and a boss 42 by which the clip 6 mounted on the clip squeezing portion 411 formed on the mounting base portion 41 is guided to be attached to the slot hole 51.

Figure 4:
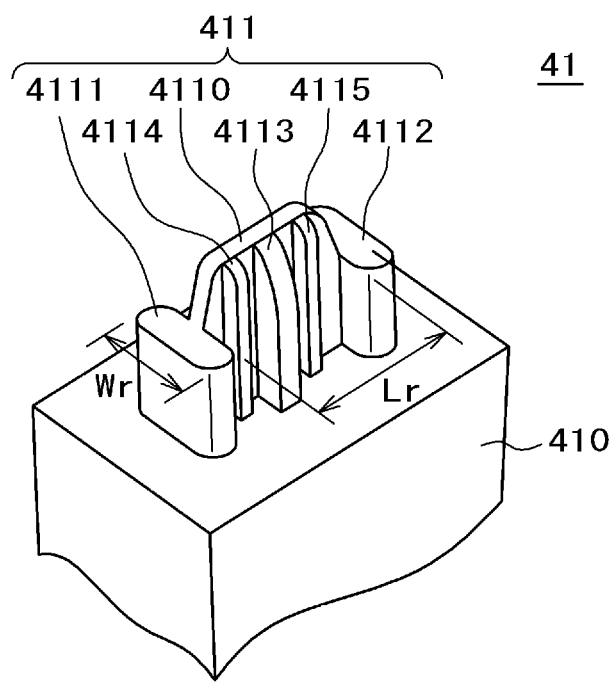
FIG. 4 is a perspective view of a mounting base formed on the resin cover of the vehicle seat according to the embodiment of the present invention.

FIG. 4 shows the shape of the mounting base portion 41 of the resin cover 4. The mounting base portion 41 is configured by a mounting base 410 and a clip squeezing portion 411 formed on an upper portion of the mounting base 410.

The clip squeezing portion 411 is formed with backlash eliminating ribs 4111 and 4112 on opposite sides in a longitudinal direction, and at a center portion of a connection portion 4110 connecting the backlash eliminating ribs 4111 and 4112, a flexure control rib 4113 is formed on both sides in a transverse direction of the connection portion 4110. On the opposite sides in the longitudinal direction of the flexure control rib 4113, ribs 4114 and 4115 for restricting the movement in the longitudinal direction of the clip 6 are formed on the both sides in the transverse direction of the connection portion 4110.

Figure 5:
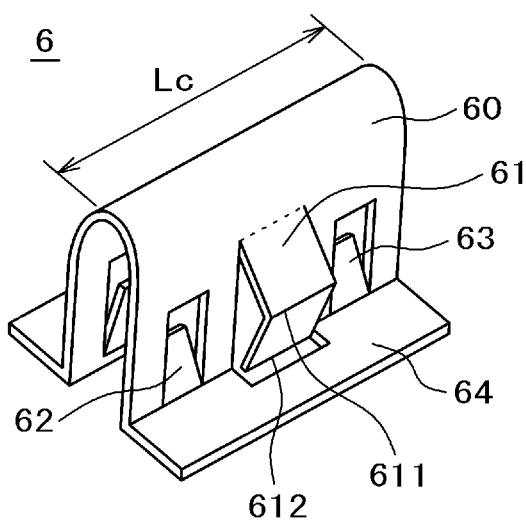
FIG. 5 is a perspective view of a metallic clip for securing the resin cover to the side frame in the vehicle seat according to the embodiment of the present invention.

FIG. 5 shows the external appearance of the metallic clip 6 which is mounted on the clip squeezing portion 411 on the mounting base portion 41 of the resin cover 4 for being inserted into the slot hole 51 formed in the side frame 5.

The clip 6 takes a form having a portion 60 bended into a U-shape and flat surfaces 64 extending on the both sides in the transverse direction of the portion 60. On the both sides in the transverse direction of the U-shape bended portion 60, claw portions 61 each bended into a "<" shape are formed at the center portion in the longitudinal direction, and coming-off prevention claws 62, 63 bended in the opposite direction to the claw portions 61 are formed on the opposite sides in the longitudinal direction of the claw portions 61. The coming-off prevention claws 62, 63 are formed to contact grooves formed inside the ribs 4114 and 4115 respectively in the state that the clip 6 is mounted on the clip squeezing portion 411 of the resin cover 4. Therefore, once the clip 6 is mounted on the clip squeezing portion 411, the clip 6 cannot simply come off even tried to come off from the clip squeezing portion 411 because the coming-off prevention claws 62, 63 bite into the groove between the ribs 4114 and 4113 and into the groove between the ribs 4115 and the 4113, respectively.

The length Lc of the clip 6 is formed to be a little shorter than the space Lr between inner side faces of the backlash eliminating ribs 4111 and 4112. Thus, the clip 6 is fitted between the backlash eliminating ribs 4111 and 4112 of the clip squeezing portion 411 and is held with its position restrained in the width (i.e., longitudinal) direction.

Figure 6:
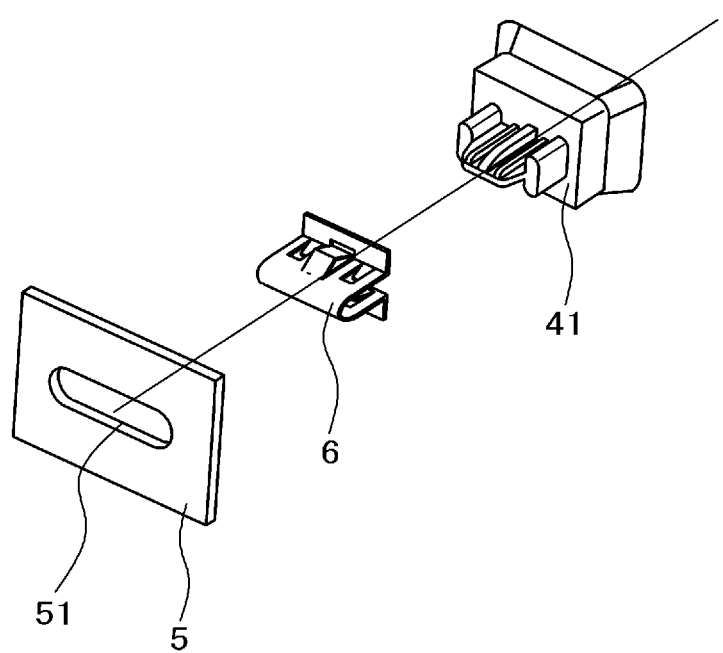
FIG. 6 is a perspective view showing the relation in a disassembled state between the resin cover, the metallic clip and the side frame in the vehicle seat according to the embodiment of the present invention.

FIG. 6 shows the relative position in a disassembled state between the slot hole 51 formed in the side frame 5, the metallic clip 6 and the mounting base portion 41 formed on the resin cover 4. In this disassembled state, first of all, the metallic clip 6 is mounted on the clip squeezing portion 411 formed on the mounting base portion 41. Then, with the metallic clip 6 mounted thereon, the clip squeezing portion 411 is inserted into the slot hole 51 formed in the side frame 5.

In the present embodiment, description will be made regarding the case that a general-purpose metallic clip is formed for a hole being 6 millimeters whereas the side frame 5 is formed with a slot hole having a width Ws of 7 millimeters.

The clip squeezing portion 411 with the metallic clip 6 mounted thereon is inserted into the slot hole 51 formed in the side frame 5, and thus, the claw portions 61 formed on the metallic clip 6 prevent the metallic clip 6 from coming off from the slot hole 51 formed in the side frame 5, whereby the resin cover is secured to the metallic frame. As a consequence, the resin cover 4 is attached to the side frame 5, whereby a surface of the metallic side frame 5 is covered with the resin cover 4.

Figure 7:
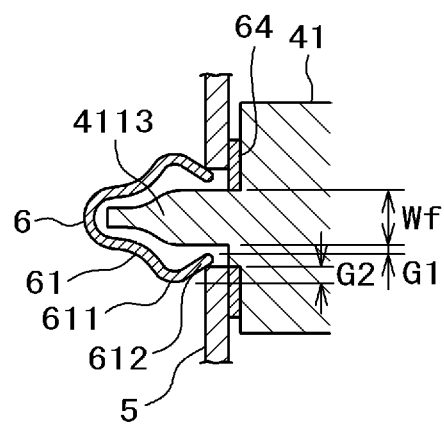
FIG. 7 is a sectional view showing the state that the resin cover is secured to the side frame with the metallic clip mounted on a clip squeezing portion formed on the resin cover in the vehicle seat according to the embodiment of the present invention.

FIG. 7 shows the section including the flexure control rib 4113 in this state. There is held a state that peak portions 611 at which the claw portions 61 bended of the metallic clip 6 spread out most in width protrude beyond the slot hole 51 of the side frame 5 on the opposite sides in the transverse direction while extreme end portions 612 of the claw portions 61 remain inside the slot hole 51.

If in this state, a gap G1 between the extreme end portion 612 of each claw 61 and the flexure control rib 4113 of the clip squeezing portion 411 were formed to be larger than an amount G2 by which the peak portion 611 of each claw 61 of the metallic clip 6 protrudes beyond the slot hole 51 outward in the width (i.e., transverse) direction, the metallic clip 6 in the state of being inserted into the slot hole 51 would easily be pulled out from the slot hole 51.

In the present embodiment, on the contrary, the width dimension Wf in the transverse direction of the flexure control ribs 4113 is set so that the gap G1 between the extreme end portion 612 of each claw 61 and the flexure control rib 4113 of the clip squeezing portion 411 becomes smaller than the amount G2 by which the peak portion 611 of each claw 61 of the metallic clip 6 protrudes beyond the slot hole 51 outward in the width (i.e., transverse) direction. That is, the dimension Wf in the transverse direction of the flexure control ribs 4113 is set so that, with the metallic clip 6 inserted into the slot hole 51, the gap G1 between the extreme end portion 612 of each claw portion 61 of the metallic clip 6 and the flexure control rib 4113 becomes smaller than the dimension G2 by which the peak portion 611 spreading outward most of each claw 61 protrudes beyond the slot hole 51.

By setting the relation between the gap G1 and the protruding amount G2 like this, it become unable to simply pull out the metallic clip 6 from the slot hole 51 where the state shown in FIG. 7 is attained once the metallic clip 6 is inserted into the slot hole 51. That is, even if it is tried to pull out the metallic clip 6 from the slot hole 51, the claw portions 61 of the metallic clip 6 are pushed by the slot hole 51 to collide at the extreme end portions 612 of the claw portions 61 with the flexure control rib 4113 of the clip squeezing portion 411 and thus, to become unable to be deformed (bended) further, so that it becomes unable for the claw portions 61 of the metallic clip 6 to go through the slot hole 51.

By setting the width dimension Wf in the transverse direction of the flexure control rib 4113 as above, the metallic clip 6, once inserted into the slot hole 51, becomes unable to be pulled out simply from the slot hole 51, and thus, it does not occur that the resin cover 4 comes off easily from the side frame 5. Thus, even where the general-purpose metallic clip 6 formed for use in the hole being 6 millimeters is used, it becomes possible to make a reliable fixation in the slot hole 51 of the side frame which is formed to have a 7 millimeter width in the transverse direction.

Figure 8:
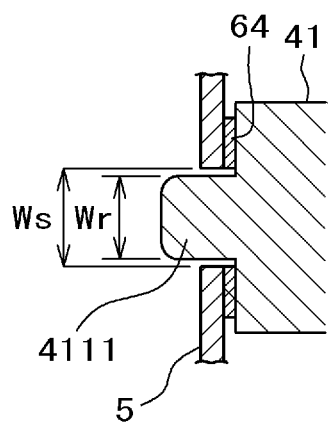
FIG. 8 is a sectional view showing a backlash eliminating rib of the clip squeezing portion inserted into the side frame in the state that the resin cover is secured to the side frame in the vehicle seat according to the embodiment of the present invention.

FIG. 8 shows the section including the backlash eliminating rib 4111 in this state. By setting the width dimension Wr in the transverse direction of the backlash eliminating ribs 4111 and 4112 to be a little smaller than the width dimension Ws in the transverse direction of the slot hole 51, the gap between the slot hole 51 and each of the backlash eliminating ribs 4111 and 4112 is almost eliminated in the state that the backlash eliminating ribs 4111 and 4112 are inserted into the slot hole 51, and hence, it becomes possible to eliminate the backlash of the resin cover 4 relative to the side frame 5.

As described hereinabove, the clip squeezing portion 411 formed on the mounting base portion 41 of the resin cover 4 is provided with the flexure control rib 4113 that restricts the moving ranges of the extreme end portions 612 of the claw portions 61 of the metallic clip 6, and the clip squeezing portion 411 is formed with the backlash eliminating ribs 4111 and 4112 having the dimension that is a little smaller than the width dimension in the transverse direction of the slot hole 51 formed in the side frame 5. As a consequence, it can be realized to reliably secure the resin cover to the slot hole of the 7 millimeter width in the transverse direction formed in the side frame 5 by the use of the general-purpose metallic clip formed for use in the hole being 6 millimeters.

Incidentally, in the present embodiment, description has been made regarding the case that by the use of the general-purpose metallic clip formed for the hole being 6 millimeters, the resin cover is secured to the slot hole formed in the side frame to have the 7 millimeter width in the transverse direction. However, the present invention is not limited to this combination of the dimension of the metallic clip with the dimension of the slot hole.

Further, although in the present embodiment, the example has been described that the resin cover 4 is attached to the side frame 5 at the lower portion of the seat cushion 1, the present invention is also applicable to securing an upper-rail finisher, an inner finisher, a front board, a back board or the like.

Moreover, the invention may be embodied in other specific forms without departing from the sprit or essential characteristics thereof. The present embodiment is therefore to be considered in all aspects as illustrative and not restrictive, the scope of the invention being indicated by the appended claims, rather than by the foregoing description, and all changes which come within the meaning and range of the equivalency of the claims are therefore intended to be embraced therein.

What is claimed is:

1. A resin cover for covering a surface of a structure by being inserted and secured together with a metallic clip into a hole portion formed in the structure, wherein:
   the resin cover is formed with a clip squeezing portion for mounting the metallic clip;
   the clip squeezing portion is formed with a flexure control rib, movement restricting ribs formed at opposite sides of the flexure control rib for restricting movement of the metallic clip in a longitudinal direction of the flexure control rib, and a pair of backlash eliminating ribs formed at outsides of the movement restricting ribs for restraining a position of the metallic clip in a longitudinal direction of the metallic clip, and
   when the metallic clip is urged to be pulled back from the hole portion formed in the structure in the state that the metallic clip mounted on the clip squeezing portion is inserted into the hole portion formed in the structure, the flexure control rib restricts deformation of a claw portion formed on the metallic clip to prevent the metallic clip from being pulled back from the hole portion formed in the structure.

2. The resin cover according to claim 1, wherein a thickness of the flexure control rib is formed to make a gap between the flexure control rib and a tip portion of the claw portion formed on the metallic clip smaller than a deformation amount necessary for the claw portion to go through the hole portion in the state that the metallic clip mounted on the clip squeezing portion is inserted into the hole portion formed in the structure.

3. The resin cover according to claim 1, wherein the backlash eliminating ribs are smaller in width than the width dimension of the hole portion formed in the structure.

4. The resin cover according to claim 1, wherein the metallic clip is sized to conform to a hole smaller in dimension than the hole portion formed in the structure.

5. A resin cover for covering a surface of a structure by being inserted together with a metallic clip into a hole portion formed in the structure to be secured, wherein:
   the resin cover is formed with a clip squeezing portion for mounting the metallic clip;
   the clip squeezing portion is formed with a flexure control rib, movement restricting ribs formed at opposite sides of the flexure control rib for restricting movement of the metallic clip in a longitudinal direction of the flexure control rib, and a pair of backlash eliminating ribs formed at outsides of the movement restricting ribs for restraining a position of the metallic clip in a longitudinal direction of the metallic clip, and
   a dimension of the flexure control rib is set to make a gap between a tip portion of a claw portion formed on the metallic clip and the flexure control rib smaller than a dimension by which the most spreading portion of the claw portion protrudes beyond the hole portion formed in the structure in the state that the metallic clip mounted on the clip squeezing portion is inserted into the hole portion formed in the structure.

6. The resin cover according to claim 5, wherein:
   the claw portion of the metallic clip takes a "<" shape; and
   the dimension of the flexure control rib is set to make the gap between the tip portion of the "<" shape and the flexure control rib smaller than a dimension by which a portion bent into the "<" shape protrudes beyond the hole portion formed in the structure.

7. The resin cover according to claim 5, wherein the backlash eliminating ribs are smaller in width than the width dimension of the hole portion formed in the structure.

8. The resin cover according to claim 5, wherein the metallic clip is sized to conform to a hole smaller in dimension than the hole portion formed in the structure.

9. A vehicle seat equipped with a seat cushion, a seat back and a head rest, wherein:
   the seat cushion is provided at a lower portion with a side frame for storing a mechanical component inside and a resin cover for covering a surface of the side frame by being inserted together with a metallic clip into a hole portion formed in the side frame;
   the resin cover is formed with a clip squeezing portion for mounting the metallic clip;
   the clip squeezing portion is formed with a flexure control rib; movement restricting ribs formed at opposite sides of the flexure control rib for restricting movement of the metallic clip in a longitudinal direction of the flexure control rib, and a pair of backlash eliminating ribs formed at outsides of the movement restricting ribs for restraining a position of the metallic clip in a longitudinal direction of the metallic clip, and
   when the metallic clip is urged to be pulled back from the hole portion formed in the side frame in the state that the metallic clip mounted on the clip squeezing portion is inserted into the hole portion formed in the side frame, the flexure control rib restricts deformation of a claw portion formed on the metallic clip to prevent the metallic clip from being pulled back from the hole portion formed in the side frame.

10. The vehicle seat having the resin cover according to claim 9, wherein a thickness of the flexure control rib is formed to make a gap between the flexure control rib and a tip portion of the claw portion formed on the metallic clip smaller than a deformation amount necessary for the claw portion to go through the hole portion in the state that the metallic clip mounted on the clip squeezing portion is inserted into the hole portion formed in the side frame.

11. The vehicle seat having the resin cover according to claim 9, wherein the backlash eliminating ribs are smaller than the width dimension of the hole portion formed in the side frame.

12. The vehicle seat having the resin cover according to claim 9, wherein the metallic clip is sized to conform to a hole smaller in dimension than the hole portion formed in the side frame.

13. A vehicle seat equipped with a seat cushion, a seat back and a head rest, wherein:
   the seat cushion is provided at a lower portion with a side frame for storing a mechanical component inside and a resin cover for covering a surface of the side frame by being inserted together with a metallic clip into a hole portion formed in the side frame;
   the resin cover is formed with a clip squeezing portion for mounting the metallic clip;
   the clip squeezing portion is formed with a flexure control rib, movement restricting ribs formed at opposite sides of the flexure control rib for restricting movement of the metallic clip in a longitudinal direction of the flexure control rib, and a pair of backlash eliminating ribs formed at outsides of the movement restricting ribs for restraining a position of the metallic clip in a longitudinal direction of the metallic clip, and
   the dimension of the flexure control rib is set to make a gap between a tip portion of a claw portion formed on the metallic clip and the flexure control rib smaller than a dimension by which the most spreading portion of the claw portion protrudes beyond the hole portion formed in the side frame in the state that the metallic clip mounted on the clip squeezing portion is inserted into the hole portion formed in the side frame.

14. The vehicle seat having the resin cover according to claim 13, wherein:
the claw portion of the metallic clip takes a "<" shape; and
the dimension of the flexure control rib is set to make the gap between a tip portion of the "<" shape and the flexure control rib smaller than a dimension by which a portion bent into the "<" shape protrudes beyond the hole portion formed in the side frame.

15. The vehicle seat having the resin cover according to claim 13, wherein the backlash eliminating ribs are smaller than the width dimension of the hole portion formed in the side frame.

16. The vehicle seat having the resin cover according to claim 13, wherein the metallic clip is sized to conform to a hole smaller in dimension than the hole portion formed in the side frame.

* * * * *